United States Patent Office 3,208,148
Patented Sept. 28, 1965

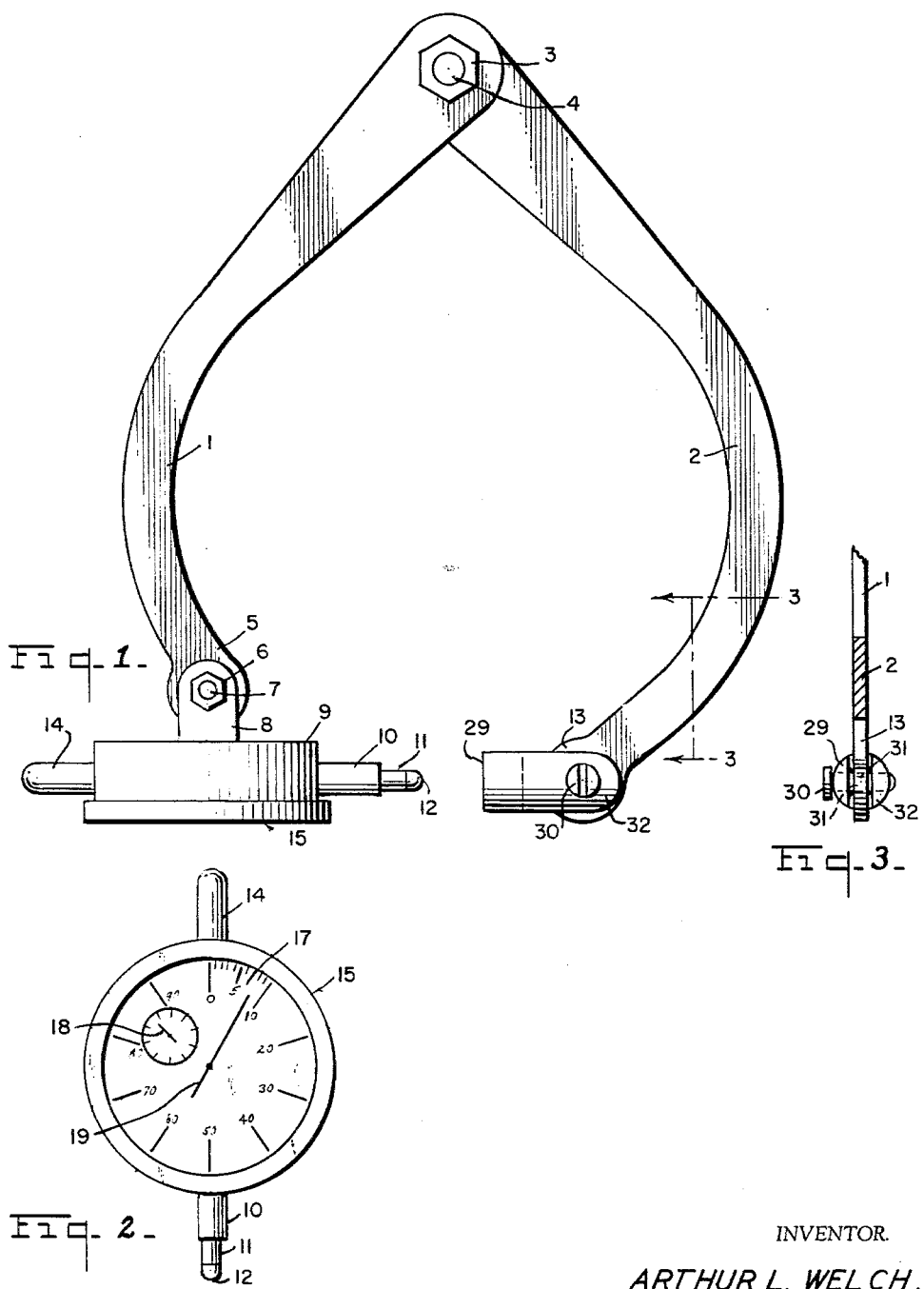

3,208,148
MACHINIST'S PIVOTAL CALIPER WITH
ATTACHED DIAL INDICATOR
Arthur L. Welch, P.O. Box 731, Wasilla, Alaska
Filed June 18, 1963, Ser. No. 288,794
3 Claims. (Cl. 33—148)

This invention is a continuation-in-part of my copending patent application, Serial No. 165,622, filed Jan. 11, 1962.

This invention relates to an improvement in micrometer calipers, and more particularly to an indicating arrangement thereof, for high precision measurements.

The principal object of the invention is to provide a micrometer caliper embodying a machinist's dual leg type caliper of the wide adjustment range type, having a micrometer caliper embodying a mechanist's dual leg type otable on the lower end of one of said legs of said caliper, and having an anvil removably fixed to the lower end of the second leg of said caliper. The dial indicator and anvil being arranged apart from each other in end spaced relationship and between the legs of the caliper in such a manner that any distance within the range of the caliper can be measured and indicated in inches, thousandths of an inch, millimeters and fraction of millimeters if a dial indicator is so calibrated and employed by the user. The different distances between the two measuring points are established by simple rod type gauges of known length, giving the desired high precision measurements.

Screw type micrometer calipers without special anvils to extend their range are generally limited to sizes under twelve inches. Large sizes are also quite heavy in order to retain accuracy simply because a screw has extreme pushing power. These larger sizes are also very expensive.

Accordingly an object of this invention is an inexpensive, simple micrometer dial reading measuring device which will rapidly determine measurements between two points within one thousandth of an inch, over a range of several inches, with a single dial type indicator serving with any number of inside and outside calipers to measure any object the user wishes to measure. This invention is also light and capable of disassembly for storage.

This type of dial indicators are manufactured in many types and measurement ranges. That type with a measuring range of at least several hundred thousandths, with each one hundred thousandths being totalled by a secondary pointer, will be best suited to this invention, since the wider the measurement range the fewer gauge rods are needed to cover the caliper's range. One limiting factor on indicator measuring range is physical size of the indicator unit. The narrower range units, say ½ inch capacity, are usually of smaller size, a feature of special importance with inside measuring calipers, since the smallest size hole the caliper will measure is limited by the length of the indicator body from measuring tip to opposite end of the indicator body.

There are two kinds of calipers in present usage to which this invention applies, inside gauging and outside gauging. Within these kinds there are firm joint calipers, illustrated in FIG. 1, usually of large gauging capacity, which are adjusted by forcing the legs against a preset tension in the joint until the measurement being sought is reached. This firm joint type is rather difficult to set accurately, a disadvantage my invention overcomes. There are also spring joint calipers which have a spring embodying the joint which holds the legs apart against an adjusting screw which is turned to bring the legs together to establish a measurement, thus making reasonably accurate measurements possible. This type caliper is generally not as strong as the firm joint type, and since the dial indicator incorporates a rotatable dial which sets the indicator needle at zero, this adjusting screw is not needed unless other reasons for using it are involved.

The manufacturing or repair process of fitting one part to another covers a great part of large size micrometer caliper use.

In my drawings which form part of this specification:

FIGURE 1 shows a firm joint dual leg outside measuring type caliper, modified to receive a dial type indicator in measuring position on one leg and with a gauging anvil added to the other leg;

FIGURE 2 shows a one inch range dial type indicator, looking at the face of it; only a portion of the thousandth inch marks are drawn on the dial;

FIGURE 3 is a fragmentary sectional view taken on line 3—3 of FIGURE 1, showing the end view of the anvil attached to the second leg of the caliper.

The well known dial type indicator of FIG. 2 employs a precision cut gear rack operating a pinion gear and sufficient gear train to magnify the movement of a plunger, slidably enclosed in the mounting stem extending from said dial indicator, said plunger operating the gear rack and gear train mentioned above.

This invention, as illustrated in the drawing, is applied to an outside type caliper, but it is to be understood that the indicating arrangement may also be applied to an inside type caliper; the details of the inside construction of the dial type indicator is not shown as a series of levers and spirals might be employed in place of the gear train mentioned, and the invention is not limited in its application to the construction shown.

The well known calipers of which an outside measuring, firm joint type is shown in FIGURE 1, are manufactured of flat stock of rectangular cross-section shaped to form similar legs 1 and 2 having a hole on the upper end of each adapted to and for bolting the mating surfaces of the legs 1 and 2 into a firm joint by means of the nut 3 and screw 4. The legs 1 and 2 are accurately shaped to terminate in lower ends 5 and 13 formed to be always in gauging position to each other in a common plane, within the measuring range of the caliper.

By forming the gauging end of the caliper leg 1 into an enlarged, generally circular disc-shaped adapter lower end 5 having a hole therein adapted to receive the bolt, or screw 7, a standard well known dial type indicator illustrated in FIG. 2, can be bolted to said caliper leg 1 by means of an industry standard lug 8 and held securely, yet pivotally, in position with the nut 6 and screw 7. The dial type indicator having an open face, a closed circular back portion and a mounting stem 10 with an operating micrometer post or plunger 11 slidable therein, and a pointer 19 assembled therewith.

The pointer 19 is positioned to sweep around the dial 17 of the dial indicator, see FIG. 2, and is driven by the terminal gear of the gear train; spring means often embodied therewith.

The anvil 29, used with outside calipers, not necessary with inside calipers, is pivotably, yet firmly attached to the caliper leg 2, see FIG. 1, said leg 2 having the leg formed into an enlarged generally circular disc shaped adapter 13 with a hole 31 sized to receive the screw 30. The anvil 29 itself has a flat faced front end, it is assembled with a generally cylindrical shaped adapter having bifurcated rear end with extensions 32 formed to slip over the lower leg end, or adapter 13. The ends 32 are compressed by the screw 30 to firmly, yet pivotably, adjustably hold the adapter face 29 in alignment with indicator tip 12.

In the operation and use of my invention, the indicator 15 is attached by the mounting lug 8, provided on the back of the case 9, being bolted to the adapter 5 on the modified leg 1 of the caliper with the nut 6 and screws 7.

This adapter 5 is formed to mate to the mounting lug 8 which is of standard size and shape established by the industry, and said adapter 5 can be formed on the leg 1 during manufacture, or attached to calipers being modified to receive it by some form of welding, riveting or screwing.

Properly handled my invention will be at least as accurate as conventional micrometer screw calipers, and will eliminate the necessity of "machinist's feel" in determining a proper measurement with the conventional micrometer. Also the technique for determining the proper point of measurement, especially on round objects, can be more easily acquired with my invention, since the process can be seen instead of having to be felt.

What I claim is:

1. In a caliper for high precision measurements comprising a pair of vertically arranged flat legs longitudinally curved and of unequal length, said legs providing a primary leg shorter than the secondary leg, said legs pivotally connected with each other at their upper ends by nut and bolt type locking means for securing their angular position relative to each other, each of said legs having an enlarged circular disc type adapter integrally formed on the lower ends thereof, each adapter having a bore centrally arranged therein and extending therethrough, a dial indicator adjustably secured with the adapter on the lower end of the primary leg, said dial indicator having a circular case embodying an open face with a visible dial incorporated therein, a closed circular back wall which has a supporting lug extending therefrom and having a free end portion, said free end portion of said lug having a bore therein and extending transversely therethrough, a second threaded bolt extending through said bore in said bore in said lug and through said bore in said adapter on said primary leg and a second adjusting nut movably secured upon said second threaded bolt operatively engaging the exterior surface of said lug to the exterior surface of said adapter on the lower end of said primary leg, said case of said dial indicator having a hollow cylindrical mounting stem secured therewith, said mounting stem having its inner end portion secured within said case and its outer end portion extending outwardly from said case in a direction towards said second leg, a solid cylindrical index plunger slidably mounted within said mounting stem and having its inner end movably secured with a pointer and its opposite end extending away from the exterior end of said mounting stem and towards said secondary leg, said pointer enclosed within said case and adapted to sweep around the dial of said dial indicator, and said solid index plunger having a contacting surface on its exterior free end thereof, a substantially cylindrical shaped anvil pivotally mounted on the adapter on the lower end of said secondary leg, said anvil having a flat circular front-end contact surface, the said circular contact surface of said anvil and the said contact surface of said index plunger being in spaced apart relationship relative to each other and arranged in a common horizontal plane between the adapters of said primary and secondary legs, and with the horizontal axis of said cylindrical index plunger in horizontal alignment with the horizontal axis of of said cylindrical anvil.

2. The caliper according to claim 1 wherein said adapters of the lower ends of said primary and secondary legs are disc shape in configuration and of the same thickness as the thickness of the rest of the legs.

3. A caliper for high precision measurements comprising two flat legs longitudinally curved and of unequal length, said legs providing a primary leg shorter than the secondary leg and said legs pivotally connected with each other at their upper end portions and provided with bolt and nut type locking means for securing their angular position relative to each other, each of said legs having a disc shaped adapter formed on its lower gauging end, each of said adapters being provided with a bore extending transversely therethrough, a dial indicator having a circular case with an open face with a visible dial therein and an upper solid back wall which has a supporting lug extending upwardly therefrom, said lug provided with a transverse bore extending therethrough, said adapter on said primary leg being movably mounted on a second bolt means arranged and passing through said bores in the said lug and said bore in the said adapter on the primary leg and pivotally secured together in position by a second locking nut threadedly mounted thereon, said dial indicator case having a hollow cylindrical mounting stem secured therewith, said mounting stem having its inner end portion secured within said case and its outer end extending outwardly from the case in a direction towards said secondary leg, a solid cylindrical index plunger slidably mounted within said mounting stem and having its inner end movably secured with a pointer within said case and its opposite end extending away from the exterior end of said mounting stem and towards said secondary leg, said indicator having a circular dial adjacent the said pointer, said dial being graduated with which the pointer coacts, a substantially cylindrical shaped anvil having flat circular vertical contacting front end surface and bifurcated supporting rear end extensions, both the extensions of said anvil provided with a bore extending transversely therethrough, the said adapter on said secondary leg being movably mounted within said extensions of said anvil, and a third screw means arranged and passing through said bores in said anvil extensions and said bores in said adapter on the secondary leg, a third nut operatively threaded on said third screw means, and said anvil pivotally secured with its longitudinal axis in a horizontal position by said screw means, and the horizontal axis of said cylindrical index plunger being in horizontal alignment with the horizontal axis of said cylindrical anvil.

References Cited by the Examiner

UNITED STATES PATENTS

| | | | |
|---|---|---|---|
| 672,124 | 4/01 | Hamilton | 33—149 |
| 765,034 | 7/04 | McClaughry | 33—148 |
| 862,765 | 8/07 | Shaffer | 33—167 |
| 962,583 | 6/10 | Pember | 33—148 |
| 1,075,929 | 10/13 | Muller | 33—165 |
| 1,198,702 | 9/16 | Cooper | 33—148 |
| 1,300,837 | 4/19 | Horstmann | 33—148 |
| 1,405,285 | 1/22 | Church | 33—149 |
| 1,646,393 | 10/27 | Mater | 33—167 |
| 2,315,806 | 4/43 | McGreevy | 33—148 |
| 2,523,551 | 9/50 | Bauer et al. | 33—172 |
| 2,592,840 | 4/52 | Bauer | 33—172 |
| 2,602,235 | 7/52 | Dow | 33—172 |
| 2,771,684 | 11/56 | Stromberg et al. | 33—172 |

ISAAC LISANN, *Primary Eaminer.*